United States Patent
Hosmer

(10) Patent No.: US 8,061,901 B2
(45) Date of Patent: Nov. 22, 2011

(54) EXTENSION MEMBER FOR A FLINGER OF A BEARING

(75) Inventor: Christopher E. Hosmer, Greer, SC (US)

(73) Assignee: Baldor Electric Company, Fort Smith, AK (US)

(*) Notice: Subject to any disclaimer, the term of this patent is extended or adjusted under 35 U.S.C. 154(b) by 618 days.

(21) Appl. No.: 12/196,633

(22) Filed: Aug. 22, 2008

(65) Prior Publication Data

US 2010/0046874 A1 Feb. 25, 2010

(51) Int. Cl.
*F16C 33/76* (2006.01)
*F16C 33/72* (2006.01)
*F16C 33/80* (2006.01)

(52) U.S. Cl. ......... 384/480; 384/477; 384/488; 384/490

(58) Field of Classification Search .......... 384/144, 384/476–478, 480, 482, 484–486, 488, 537, 384/569, 589; 277/370, 399, 402, 420, 551
See application file for complete search history.

(56) References Cited

U.S. PATENT DOCUMENTS

| | | | |
|---|---|---|---|
| 2,439,267 A | | 4/1948 | Shafer |
| 2,639,954 A * | | 5/1953 | Potter ............ 384/484 |
| 2,884,285 A | | 4/1959 | King |
| 2,888,304 A * | | 5/1959 | Kooistra .......... 384/484 |
| 2,917,328 A * | | 12/1959 | Peterson ........... 277/421 |
| 3,245,735 A * | | 4/1966 | Sikora ............ 384/482 |
| 4,261,625 A | | 4/1981 | Renaud |
| 4,277,114 A * | | 7/1981 | Lindegger .......... 384/480 |
| 4,355,992 A * | | 10/1982 | Ladin ............. 277/402 |
| 4,664,538 A | | 5/1987 | Galbato |
| 4,792,242 A * | | 12/1988 | Colanzi et al. ........ 384/478 |
| 4,921,229 A | | 5/1990 | Hori |
| 4,944,611 A * | | 7/1990 | Ankenbauer et al. ..... 384/476 |
| 4,969,755 A | | 11/1990 | Parzefall |
| 5,017,024 A * | | 5/1991 | Clark et al. ......... 384/482 |
| 5,183,269 A * | | 2/1993 | Black et al. ......... 277/349 |
| 5,328,276 A | | 7/1994 | Linteau |
| 5,711,618 A | | 1/1998 | Waskiewicz |
| 6,637,943 B2 * | | 10/2003 | Novak et al. ......... 384/478 |
| 6,672,768 B2 | | 1/2004 | Borsch et al. |
| 7,097,363 B2 | | 8/2006 | Ostrander et al. |
| 7,103,975 B2 | | 9/2006 | Borsch et al. |
| 2003/0035718 A1 | | 2/2003 | Langston et al. |

FOREIGN PATENT DOCUMENTS

JP  2004100917 A  * 4/2004
JP  2006266451 A  * 10/2006

OTHER PUBLICATIONS

Co-pending U.S. Design U.S. Appl. No. 29/323,329, filed Aug. 22, 2008 and entitled "Extension Member for a Flinger of a Bearing".
International Search Report and Written Opinion dated Oct. 8, 2009 for PCT/US2009/054561, 7 pages.

* cited by examiner

*Primary Examiner* — Marcus Charles
(74) *Attorney, Agent, or Firm* — Thompson Coburn LLP

(57) ABSTRACT

A bearing is disclosed comprising an inner ring concentrically disposed with an outer ring with rotational elements therebetween adapted for allowing rotational movement of the inner ring relative to the outer ring. A flinger may be secured to the inner ring having an extension member formed from a resilient material. The extension member may extend radially outward from the flinger along an axial side of the bearing and engages a portion of a side face of the outer ring during operation of the bearing.

21 Claims, 2 Drawing Sheets

EXTENSION MEMBER FOR A FLINGER OF A BEARING

BACKGROUND AND SUMMARY OF THE INVENTION

The instant application is directed to an extension member of a flinger of a bearing. The bearing comprises an inner ring concentrically disposed with an outer ring with rotational elements therebetween adapted for allowing rotational movement of the inner ring relative to the outer ring. A seal seals a space between the outer ring and inner ring. A flinger is secured to one of the inner ring and outer ring outboard of the seal. The flinger has an extension member that extends radially outward from the flinger along an axial side of the bearing and engages a portion of a side face of the other of the inner and outer ring.

DETAILED DESCRIPTION OF THE DISCLOSED EMBODIMENTS

Figure 1:
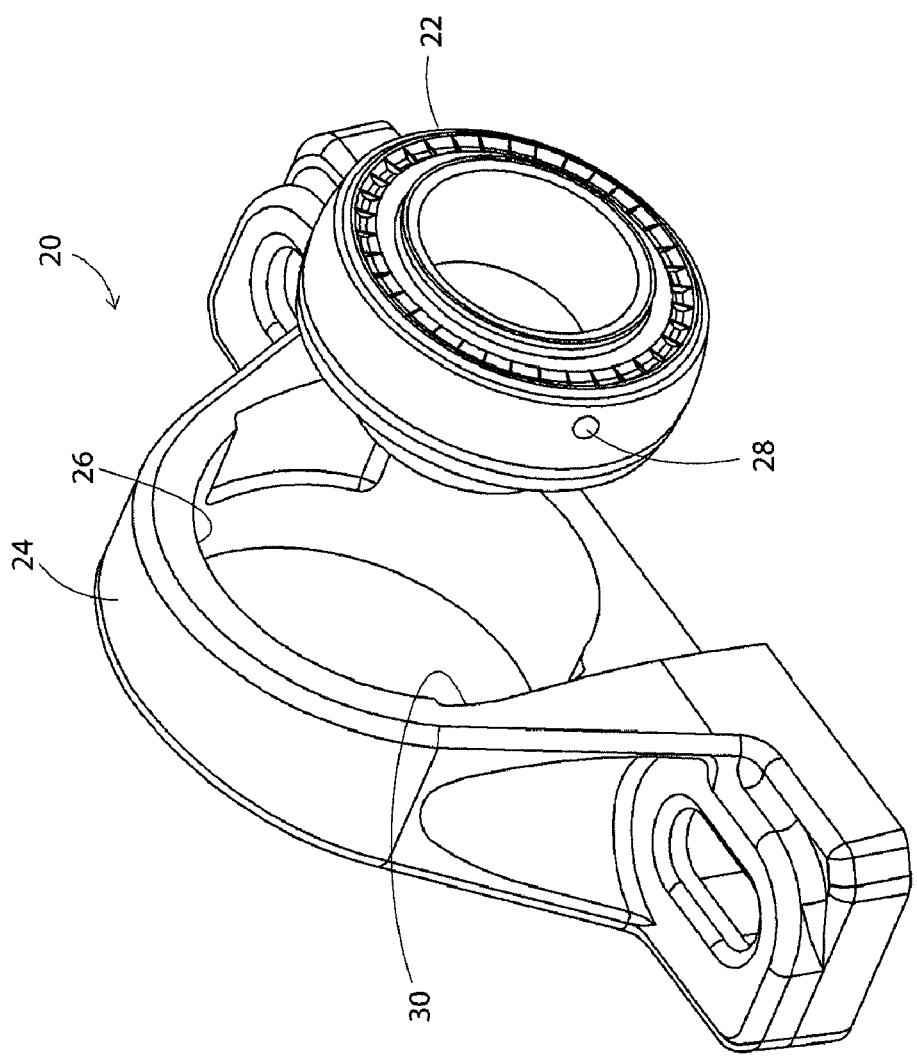
FIG. 1 illustrates an exploded, perspective view of a bearing and a bearing housing.

Referring to FIG. 1, a bearing assembly 20 comprising a bearing 22 and a housing 24 for the bearing is shown. The bearing assembly 20 may comprise a pillow block bearing as shown in FIG. 1, or a flanged or take-up slot bearing assembly configuration. The housing 24 may be solid or split and the bearing assembly may be sealed or be provided with re-lubrication features. The bearing assembly 20 may be provided as a unit with the bearing factory installed in the housing. The bearing may be supplied separately to be assembled by an end-user with a housing, as needed. The materials used in connection with the bearing assembly widely vary depending upon the application, and may include polymers, steels, iron, and/or other cast materials. The bearing housing has an inner bore which is sized to receive the bearing.

The bearing housing has a bore 26 sized to fit the bearing. The bearing housing bore 26 may have a spherical shape to allow the bearing to be self-aligning and/or self-centering. That is, the outer ring may have an outer diameter surface with a contour that is shaped to fit in the bearing housing bore. However, the bearing housing bore and bearing may have other configurations such as cylindrical. The bearing and bearing housing may be keyed and/or have anti-rotational features 28,30 to prevent rotation of the bearing within the housing during operation.

Figure 2:
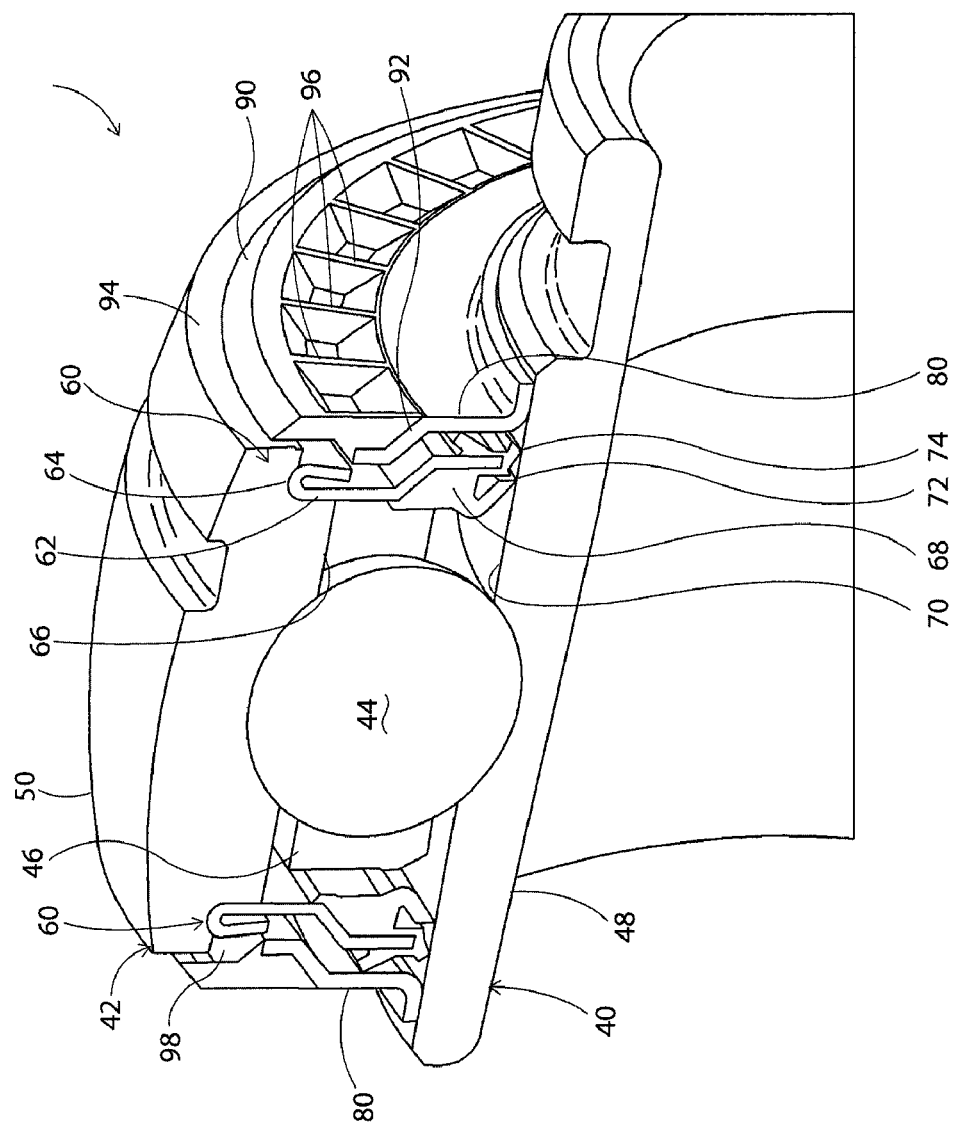
FIG. 2 illustrates a cross-sectional view of the bearing of FIG. 1 with a flinger and extension member mounted on an inner ring of the bearing of FIG. 1.

Further detail of the bearing 22 is shown in FIG. 2. The bearing has an inner ring 40 concentrically disposed with an outer ring 42 with rotational elements 44 therebetween that allow rotational movement of the inner ring relative to the outer ring. As shown in FIG. 2, the rotational elements 44 comprise ball bearings constrained in a spaced circumferential orientation around the bearing with a cage 46. Other rotational elements, such as cylinders, tapered pins or rollers may also be used. The cage may comprise steel, nylon, or polymer materials, depending upon the application.

The inner ring has a bore 48 which is sized to accommodate a rotating shaft or other rotating element as may be dictated by a particular application. The outer ring has an outer diameter surface 50 with a contour which is shaped to fit in the bearing housing bore 26, as described previously. The configuration shown in the drawing figures, the inner ring rotates while the outer ring is held stationary. However, it should be appreciated that other configurations of the bearing may be used including fixing the inner ring and rotating the outer ring.

The bearing has an internal seal 60 on axial sides of the bearing to prevent contaminants from interfering with the operation of the rotational elements. As shown in the drawing figures, the internal seal 60 comprises a support member 62 extending from a groove 64 formed on an inner diameter surface 66 of the outer ring 42. At the distal end portion of the support member 62, a wiper 68 is fitted to engage an outer diameter surface 70 of the inner ring 40. The wiper shown has two edges 72,74 to provide sealing contact with the inner ring outer diameter surface 70. Other configurations of wipers and wiper edges may be used depending upon the application. The internal seal 60 retains lubricant between the inner and outer rings 40,42 and assists in preventing contamination ingress therebetween. The internal seal 60 together with the grease acts as a labyrinth seal and filter to exclude contaminants from interfering with the operation of the rotational elements between the inner and outer ring. The orientation of the internal seal may also be reversed such that the support member may be attached to an outer diameter of the outer ring and the wiper may contact an inner diameter of the outer ring.

A flinger 80 is provided on the exterior of the bearing adjacent the internal seal 60. The flinger acts 80 as a shield to protect the internal seal. As shown in FIG. 2, the flinger 80 is secured to the inner ring 40 and rotates with the inner ring to assist in repelling debris and contaminants. The flinger may also be secured to the outer ring. As shown, the bearing is provided with a flinger on both axial sides of the bearing. However, depending upon the application, a flinger may be used on one axial side of the bearing. The flinger may also have a shape which closely matches the internal seal support member to shield in the inner seal support and form a labyrinth seal therewith.

An extension 90 member may be provided on the flinger 80. The extension member 90 extends radially from the flinger along an axial side of the bearing. As shown, the extension member 90 extends radially outward from the flinger in a direction toward the outer ring. However, the extension member may extend radially inward from the flinger toward the inner ring. Preferably, the flinger 80 is formed with a hub 92 and the extension member 90 is mounted on the hub. During operation of the bearing, the extension member may engage a portion of a side face 94 of the outer ring 42, preferably forming a seal with the outer ring side face during operation of the bearing. The outer ring side face 94 is preferably a ground surface to reduce frictional contact between the extension member and the outer ring side face during operation of the bearing. The extension member 90 may have a slight interference fit with the outer ring side face. The extension member 90 may also deflect during operation of the bearing to engage the outer ring side face. In that regard, the extension member is preferably made from a resilient material, such as rubber, to allow it to deflect during operation of the bearing to engage the outer ring side face. The extension member may also extend radially outward from the flinger a distance sufficient such that the extension member overlays the outer ring side face when the bearing is not operational. In some applications, the extension member may contact the outer ring side face when the bearing is stationary, and as the bearing rotates, the flinger may deflect to a neutral position or away from the outer ring side face as necessary to reduce friction. As described above, the orientation of these features may be reversed when the flinger is mounted to the outer ring.

The cross-sectional geometry of the extension member 90 may be configured to enhance the sealing and deflection characteristics of the extension member when the bearing is operating. For instance, the extension member may be formed with stiffening struts 96 on its inner and/or outer side faces depending upon the material used for forming the extension member. When the extension member is formed from a rubber or other resilient material, the stiffening struts 96 may have a geometry that allows the extension member to deflect during operation of the bearing to engage the outer ring side face. For instance, the stiffening struts may form radial protrusions on an outer side face of the extension member to create a fanning action to deflect debris and other contaminants away from the bearing. The fanning action and rotation may develop force sufficient to deflect the extension member to form the seal. It should be appreciated that the fanning action and rotation may also develop force sufficient to deflect the extension member to a neutral position or a position away from the outer ring side face to reduce friction. Depending upon the application in which the bearing was used, the stiffening struts may be designed to deflect in accordance with the expected pressurized flow of material towards the bearing. The stiffening struts may also be configured to form pockets 98 on an inner side face of the extension member for holding grease and other lubricant for the bearing. Together, the flinger 80, extension member 90, and internal seal 60 with lubricant and grease disposed therebetween acts as a labyrinth seal to prevent the ingress of contaminants that might otherwise interfere with operation of the rotational elements of the bearing.

While the specific embodiments have been described in detail in the foregoing detail description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the pending claims and any and all equivalents thereof.

What is claimed is:

1. A bearing comprising:
an inner ring concentrically disposed with an outer ring with rotational elements therebetween adapted for allowing rotational movement of the inner ring relative to the outer ring;
a seal sealing a space between the outer ring and inner ring; and
a flinger comprising a substantially rigid disk-like member secured to one of the inner ring and outer ring immediately adjacent to and outboard of the seal, the flinger having an outer diameter dimension sufficient to shield the seal from contaminants, the flinger having a resilient extension member mounted on its distal end, the extension member extending radially outward from the flinger along an axial side of the bearing and engaging a portion of an outer side face of the other of the inner ring and the outer ring to form together with the seal a labyrinth seal between the rings of the bearing.

2. The bearing of claim 1, wherein the extension member has a slight interference fit with the outer ring side face.

3. The bearing of claim 1, wherein the extension member has radial protrusions on its outer side face configured for fanning action when the inner ring rotates.

4. The bearing of claim 1, wherein the extension member is a rubber material.

5. The bearing of claim 1, wherein the extension member has a pocket on its inner side face configured for holding lubricant.

6. The bearing of claim 1, wherein the extension member deflects so as to engage the portion of the side face of the other of the inner ring and the outer ring.

7. The bearing of claim 1, wherein extension member forms a seal between the rings of the bearing when the bearing is stationary.

8. The bearing of claim 1, wherein the extension member has stiffening struts on its inner and outer side faces.

9. The bearing of claim 1, wherein the flinger has a hub on which the extension member is mounted.

10. A bearing comprising:
an inner ring concentrically disposed with an outer ring with rotational elements therebetween adapted for allowing rotational movement of the inner ring relative to the outer ring;
a seal sealing a space between the outer ring and inner ring; and
a flinger comprising a substantially rigid disk-like member secured to the inner ring immediately adjacent to and outboard of the seal, the flinger having an outer diameter dimension sufficient to shield the seal from contaminants, the flinger having an extension member formed from a resilient material mounted on its distal end, the extension member extending radially outward from the flinger along an axial side of the bearing and deflecting against a portion of an outer side face of the outer ring to form together with the seal a labyrinth seal between the rings of the bearing.

11. The bearing of claim 10, wherein the extension member has a slight interference fit with the outer ring side face.

12. The bearing of claim 10, wherein the extension member is formed from a rubber material.

13. The bearing of claim 10, wherein the extension member has stiffening struts on outer side faces.

14. The bearing of claim 13, wherein the stiffening struts form pockets on an inner side face of the extension member for holding lubricant.

15. The bearing of claim 13, wherein the stiffening struts form radial protrusions on an outer side face of the extension member for fanning action away from the bearing.

16. The bearing of claim 13, wherein the stiffening struts are configured to deflect the extension member against the outer ring side face during operation of the bearing.

17. The bearing of claim 10, wherein the flinger has a hub on which the extension member is mounted.

18. The bearing of claim 10, wherein the extension member forms the seal with the side face of the outer ring.

19. The bearing of claim 10, wherein the extension member forms the seal when the bearing is stationary.

20. The bearing of claim 10, wherein the extension member overlays the side face of the outer ring when the bearing is not operational.

21. The bearing of claim 10, wherein the extension member deflects against the portion of the side face of the outer ring during operation of the bearing.

* * * * *